United States Patent
Abramov et al.

(10) Patent No.: US 8,776,547 B2
(45) Date of Patent: Jul. 15, 2014

(54) LOCAL STRENGTHENING OF GLASS BY ION EXCHANGE

(75) Inventors: Anatoli Anatolyevich Abramov, Painted Post, NY (US); Sinue Gomez, Corning, NY (US); Lisa Anne Moore, Corning, NY (US); Alexander Mikhailovich Streltsov, Corning, NY (US); Sergio Tsuda, Horseheads, NY (US); Jonathan E Walter, Woodhull, NY (US)

(73) Assignee: Corning Incorporated, Corning, NY (US)

( * ) Notice: Subject to any disclaimer, the term of this patent is extended or adjusted under 35 U.S.C. 154(b) by 400 days.

(21) Appl. No.: 13/370,742

(22) Filed: Feb. 10, 2012

(65) Prior Publication Data

US 2012/0216570 A1     Aug. 30, 2012

Related U.S. Application Data

(60) Provisional application No. 61/447,281, filed on Feb. 28, 2011.

(51) Int. Cl.
    *C03C 21/00*     (2006.01)
(52) U.S. Cl.
    CPC ............. *C03C 21/002* (2013.01); *C03C 21/008* (2013.01)
    USPC ......................................... 65/30.14; 65/30.13

(58) Field of Classification Search
    CPC .... C03C 21/00; C03C 21/001; C03C 21/002; C03C 21/008
    USPC ................................................ 65/30.13, 30.14
    See application file for complete search history.

(56) References Cited

U.S. PATENT DOCUMENTS

| 4,468,534 | A | 8/1984 | Boddicker |
| 4,702,042 | A | 10/1987 | Herrington et al. |
| 7,810,355 | B2 * | 10/2010 | Feinstein et al. ............... 65/30.1 |
| 8,539,794 | B2 * | 9/2013 | Cornejo et al. .............. 65/30.14 |

(Continued)

FOREIGN PATENT DOCUMENTS

| GB | 1222182 | 8/1971 |
| JP | 2000-233949 | 8/2000 |

(Continued)

OTHER PUBLICATIONS

Abstract of JP 2000233949.
PCT/US2012/026017 Search Report.

*Primary Examiner* — Joseph S Del Sole
*Assistant Examiner* — Russell Kemmerle, III
(74) *Attorney, Agent, or Firm* — Timothy M Schaeberle

(57) ABSTRACT

This disclosure describes a process for strengthening, by ion-exchange, the edges of an article separated from a large glass sheet after the sheet has been ion-exchanged to strengthen by exposing only the one or a plurality of the edges of the separated article to an ion-exchange medium (for example without limitation, a salt, paste, frit, glass) while the glass surface is maintained at temperatures less than 200° C.

9 Claims, 4 Drawing Sheets

(56) References Cited

U.S. PATENT DOCUMENTS

| | | |
|---|---|---|
| 2005/0221044 A1 | 10/2005 | Gaume et al. |
| 2008/0128953 A1 | 6/2008 | Nagai et al. |
| 2009/0324899 A1* | 12/2009 | Feinstein et al. ........... 428/195.1 |
| 2010/0206008 A1 | 8/2010 | Harvey et al. |
| 2010/0210442 A1 | 8/2010 | Abramov et al. |
| 2011/0019123 A1* | 1/2011 | Prest et al. ...................... 349/58 |
| 2011/0183118 A1* | 7/2011 | Lamberson et al. ........... 428/157 |
| 2012/0111056 A1* | 5/2012 | Prest ............................ 65/30.14 |
| 2012/0196071 A1* | 8/2012 | Cornejo et al. .................. 428/43 |
| 2012/0214004 A1* | 8/2012 | Hashimoto et al. ........... 428/428 |
| 2012/0236526 A1* | 9/2012 | Weber ........................... 361/807 |
| 2013/0071601 A1* | 3/2013 | Bibl et al. ....................... 428/67 |

FOREIGN PATENT DOCUMENTS

| | | |
|---|---|---|
| JP | 200483378 | 3/2004 |
| JP | 2004352535 | 12/2004 |
| JP | 20087360 | 1/2008 |
| JP | 20087384 | 1/2008 |
| JP | 2008247732 | 10/2008 |
| WO | 2004106253 A1 | 12/2004 |
| WO | 2008108332 A1 | 9/2008 |
| WO | 2010/101961 | 9/2010 |

* cited by examiner

LOCAL STRENGTHENING OF GLASS BY ION EXCHANGE

PRIORITY

This application claims the benefit of priority under 35 U.S.C. §119 of U.S. Provisional Application Ser. No. 61/447,281 filed on Feb. 28, 2011 the content of which is relied upon and incorporated herein by reference in its entirety.

FIELD

This application is directed to chemically strengthened glass, and in particular to the local strengthening the edge(s) of a glass article after the article has been cut from a large sheet of chemically strengthened glass.

BACKGROUND

Chemically-strengthened glasses have found wide-spread application in touch panels and portable displays because of their excellent strength and damage resistance. These properties are particularly important when the glass acts as a cover glass for a device that is exposed to high levels of contact with surfaces. The damage resistance of the chemically strengthened glasses is a direct result of surface compression layers formed on the glass substrate via ion-exchange. The surface compression is balanced by a tensile region in the interior of the glass. Surface compressions (CS) greater than 750 MPa and compressive layer depths (DOL) greater than 40 microns are readily achieved in glasses, for example, Gorilla™ Glass (Corning Incorporated). By comparison, ordinary soda-lime glass has been able to reach only modest surface compression ("CS") and depth-of-layer ("DOL"), which are typically<500 MPa<15 micron, respectively.

Recently the touch panel industry has been interested in putting the touch sensor directly on the chemically-strengthened cover glass instead of laminating a separate touch panel structure to the cover glass as is the current practice (see FIG. 1). The most economical manufacturing process would be to pattern multiple touch sensors onto a single large sheet of chemically strengthened glass, and then cut out the individual parts from the sheet having the touch sensors thereon. The magnitude of compressive stress and the elastic energy stored in the central tension region of the chemically strengthened glass, however, makes mechanical cutting of the substrates difficult. Hence, most of the current production processes involve cutting and finishing the non-ion-exchanged glass substrate to shape beforehand and ion exchanging afterwards. In this case, the touch sensor would have to be patterned separately onto each individual part (a "piece-part" process), which is not as economical as the "full sheet" process.

Methods for cutting tempered and chemically strengthened glass substrates have been disclosed in several patent and patent applications publications [for example, see, U.S. Pat. No. 4,468,534, US 2008-0128953, US 2010-0206008, US 2010-0210442, and JP 2008-007384], some of which are suitable for separating highly strengthened glass. It has been disclosed that setting limits on the stress profile can allow conventional cutting methods to be employed [for example, see US 2005-0221044, JP 2008-007369, JP 2004-352535, JP 2004-083378, GB 1222181 and WO 2008-108332]. However, the latter methods suffer by limiting the level of compression and/or depth of layer and, therefore, damage resistance that can be achieved in the glass. A serious drawback of both cutting techniques is the fact that the edge of the article after the separation process is not ion-exchanged and is therefore subject to damage and possible delayed failure (fatigue). Consequently, it is desirable to have a process which provides compression on the edge(s) of the parts after the separation process for both damage and fatigue resistance.

While high edge strength can be accomplished by acid etching the edge after the separation process using a coating for protecting the glass surface [for example, see commonly assigned U.S. patent application Ser. No. 12/862,096], there is still a problem. That problem is maintaining such strength. If the edge gets damaged post-acid treatment, the strength would be reduced. In other words, this process does not protect the glass from damage, for example, during use by a consumer. Consequently, it is desirable to have a process that provides compression on the edge of an article, after the separation of the article for a large glass sheet, with regard to both damage and fatigue resistance.

It is known that the films that comprise the touch sensor function are sensitive to high temperatures, and such film are usually limited to withstanding temperatures lower than 200° C.; that is, this is the maximum temperature to which such films should be subjected. This disclosure relates to locally ion-exchanging the glass edge(s) while maintaining the glass surface at temperatures<200° C., particularly when the glass has a touch sensor on a surface.

SUMMARY

This disclosure describes a process for strengthening, by ion-exchange, the edges of a glass article, separated from a large glass sheet after the large sheet has been ion-exchanged to strengthen its surfaces, by exposing the one or a plurality of the edges only of the separated article to an ion-exchange medium (for example without limitation, a salt, paste, frit, glass) while the glass surface(s) is/are maintained at temperatures less than 200° C. In one embodiment one or both of the top and bottom edges of the article, as taken from the user's perspective, when using a device, for example a mobile phone, incorporating the article, is ion-exchanged. In another embodiment all the edges of the glass article are ion-exchanged. The glass articles have a length, width and thickness; the length and width determining the first and second faces or surfaces of the glass, and the edge defined by the thickness of the glass between the surfaces. The edge can be flat or shaped, for example without limitation, having a chamfered, beveled or bull nosed shape.

The key advantage of the method of the present disclosure is the ability to obtain chemically strengthened edges which have higher mechanical strength than non-ion-exchanged edges while maintaining the integrity of the touch sensor films deposited on one or more surfaces of a glass article made from such chemically strengthened glass, as well as the properties of the ion-exchange surface. The method described enables a full sheet process for manufacturing touch panels directly on chemically strengthened glass. A further key advantage of the present disclosure is the mitigation of fatigue-related failures, that is, delayed failure, due to the presence of a tensile layer on the edge.

The disclosure is directed to a method for strengthening one or a plurality of the edges of a glass article cut from a large sheet of ion-exchanged glass, the method comprising the steps of providing a glass article having alkali metal ions in said glass, and having one or a plurality of edges defined by a chemically strengthened first and second glass face, and a selected thickness, wherein one or a plurality of said edges is not chemically strengthened; providing a ion-exchange material for chemically strengthening the one or plurality of edge, said ion-exchange material containing alkali metal ions large than the alkali metal ions in said glass; applying the ion-exchange material to the one or plurality of edges; heating the ion-exchange material applied to the one or plurality of edges to a selected temperature for a selected time to thereby exchange smaller ions in the glass for larger ions in the ion-exchange material; and removing the ion-exchange material from the one or plurality of edges to thereby provide an article having a selected compressing stress to a selected depth along the one or plurality of edges. During the edge strengthening process the surfaces of the glass article are kept at a temperature of less than 200° C. by passing a cooling gas across the surfaces of the glass article during the ion-exchange step. The glass is a chemically strengthened glass selected from the group consisting of aluminosilicate, borosilicate, aluminoborosilicate and soda lime glasses.

In one embodiment the ion-exchange material is a molten alkali metal salt, the salt typically being substantially a nitrate salt bath into which an edge of said glass article is inserted, the salt bath having a selected temperature is in the range of 390° C. to 600° C., for a selected time is in the range of 10 minutes to 60 minutes. In another embodiment the ion-exchange material applied to the one or plurality of edges is a paste containing alkali metal ions larger than the exchangeable alkali metal ions in the glass. In an embodiment the paste is heated by microwave radiation. In a further embodiment the glass article has touch screen electronics on one of said faces of said glass and both said faces of said glass faces are cooled during the heating of the ion-exchange material applied to said one or plurality of edges. In an embodiment the glass article has a thickness in the range of 0.3 mm to 1.5 mm. In an embodiment the ion-exchange along said one or plurality of edges produces a depth-of-later of 40-50 µm and a compressive stress in the range of 180 to 600 MPa.

DETAILED DESCRIPTION

Figure 1:
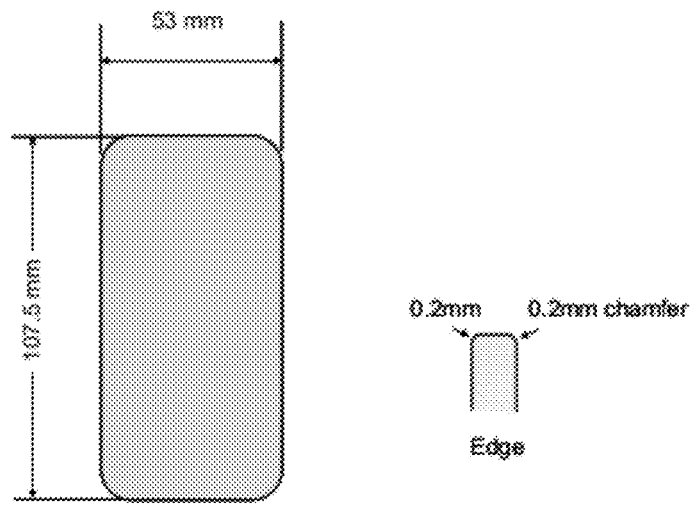
FIG. 1 is an illustration of a generic cover glass's shape and edge.
Figure 2:
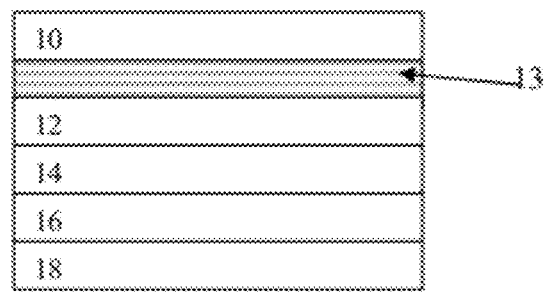
FIG. 2, is a schematic diagram of a fully integrated touch panel with touch electronic films (ITO rows and columns 13) patterned on the chemically strengthened cover glass 10, with 12 being a polarizer, 14 being a front glass, 16 being another glass, and 18 being the backlight.
Figure 3:
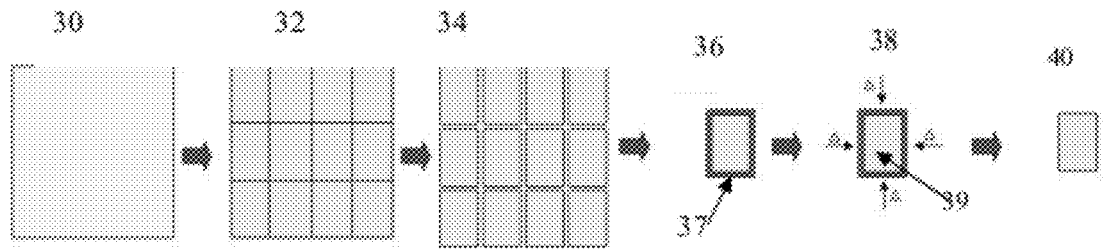
FIG. 3 is a schematic representation of the process of the present disclosure wherein 30 is an ion-exchanged glass sheet, 32 is a glass sheet in which the electronics have been applied to the sheet in a sectional manner before the sheet is cut, 34 is an illustration of the cut sheets after the electronic have been applied, 36 represents the ion-exchange material or media applied to the edges of the glass article, 36 illustrates the application of heat to the edges of the glass article while the glass surface is cooled and 38 represents the washing off of the applied ion-exchange material or media that has not interacted with the glass edge and remains on the edge.

The present disclosure is directed to a method for strengthening the edges of post-ion-exchanged, separated glass. That is, to a process for strengthening the edges of glass parts made by dividing a large ion-exchanged glass sheet 30 such as illustrated in FIG. 3 at numeral 34. The process consists on exposing the edges to an ion-exchange material and locally heating only the edge or edges to create a compressive layer while the glass surface is maintained at temperatures below 200° C. FIG. 1 shows a generic part shape and the edge shape for a cover glass used on a mobile device such as a mobile phone with a touch sensor element. FIG. 2 depicts a schematic of a fully integrated touch panel with touch electronic films 13 ("ITO rows and columns") patterned on the chemically strengthened cover glass 10. Numeral 12 represents a polarizer, numeral 14 a front glass, numeral 16 another glass element, and numeral 16 the backlight. Larger-scale variations of this general shape could be used for other touch and/or cover glass applications such as laptop or notebook computers, electronic tablet computers and book readers, and LCD TV cover glass.

The process disclosed herein is schematically represented in FIG. 3. In this process, a large ion-exchanged glass sheet 30, for example without limitation, a 1300 mm×1100 mm sheet of glass, with a thickness between 0.3 mm and 1.5 mm has a plurality of touch screen electronic or films applied thereto as represented 32, the films for the touch sensor being applied to the ion-exchanged glass sheet in a desired fashion (geometry, part size). The glass that was ion-exchanged can be any glass containing ions that can be ion-exchanged for larger ions, for example, exchanging sodium or lithium ions in a glass for potassium ions from a salt bath. Exemplary glasses include, without limitation, aluminosilicate glass, aluminoborosilicate glass, borosilicate or soda line glass. Next the ion-exchanged glass sheet with the touch screen films 32 was separated into a plurality of individual parts as represented by numeral 34 using different separation/cutting methods such as laser full separation, laser score and break, mechanical score and break, acid etching. As shown in illustration 36, the edges of the individual parts are then coated with an ion-exchange medium 37 which is, for example without limitation, a paste, salt, frit, glass, etc that contains ion-exchangeable ions (for example, $K^{+1}$ ions for exchanging with $Na^{+1}$ or $Li^{+1}$ ions in the glass). The edge or edges with the K-containing medium thereon are then locally heated as shown in illustration 38 by the symbol Δ (for example without limitation, by using convection, induction, laser or microwaves heating), while the glass surface is maintained cool (<200° C.) by using, for example without limitation, water, air, an inert gas, carbon dioxide, nitrogen gas and other gases as is represented by numeral 39. Finally, the samples are washed to remove ion-exchange medium.

Figure 4:
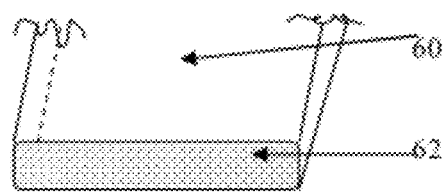
FIG. 4 is an illustration of a glass part 50 whose edge 52 has an ion-exchanging paste 42, for example, a potassium containing paste, applied to the edge.

FIG. 4 is an illustration of a glass part 60 and an edge of the part having an ion-exchanging paste, for example, a potassium containing paste, applied to the edge as illustrated at 62. An exemplary ion-exchange material consists of $KNO_3$, clay and water applied to the edges as is illustrated in FIG. 4. Once the edge or edges are coated with the ion-exchange material, the parts can be treated at temperatures between 330-500° C. for periods of 10 minutes to 7 hours while constantly cooling the glass surface, as described above, for example without limitation, using air or nitrogen gas as represented by numeral 39 in FIG. 3. Finally, the ion-exchange medium that was applied to the edge or edges is washed off using water to provide a glass article having edges strengthened by ion-exchange as illustrated by numeral 40.

Figure 5A:
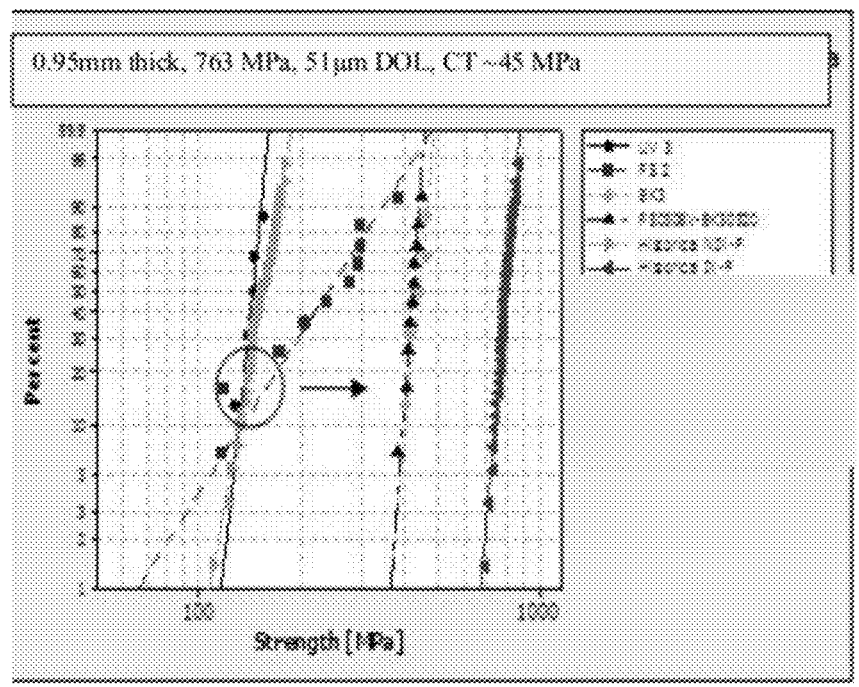
FIGS. 5A and 5B are charts illustrating horizontal (FIG. 5A) and vertical (FIG. 5B) edge strength for laser separated ion-exchanged glass using different laser methods, pre- and post-local ion-exchange with a potassium containing paste at 410° C. for seven hours.
Figure 5B:
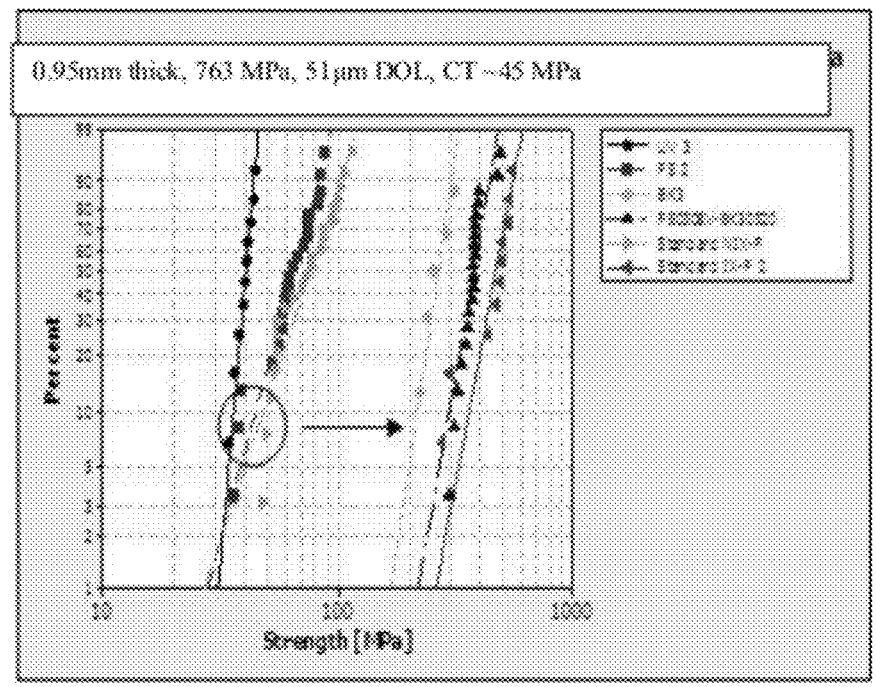

FIGS. 5A and 5B shows the Weibull plots for post-ion-exchanged, separated edges treated using a clay/KNO3 paste as the ion-exchange medium. FIGS. 5A and 5B show the horizontal (5A) and the vertical (5B) edge strength for laser separated ion-exchanged glass using different laser methods, pre- and post-local ion-exchange with a potassium containing paste at 410° C. for seven hours. The paste was applied to the edges and then the edges were heated at approximately 410° C. for 7 hours in an oven. The surface was also heated during this process. After heat treatment the paste was removed by washing in water. The localized ion-exchange treatment of the edge(s) of the glass improved the mean strength of the samples by a factor of 2-4 times (2×-4×) as compared to the as-separated/cut glass. The average edge strength of the samples before and after separation using different laser methods is reported in Table 1. Table 1 shows the edge strength as measured by a horizontal bend test, both before and after treatment using a $K^{+1}$-containing paste at 410° C., on samples separated using FS and UV lasers.

TABLE 1

| Laser Separation Method | Strength, MPa | |
| --- | --- | --- |
| | Pre-treatment | Post-treatment |
| FS | 268 | 430 |
| UV | 146 | 449 |

Figure 6:
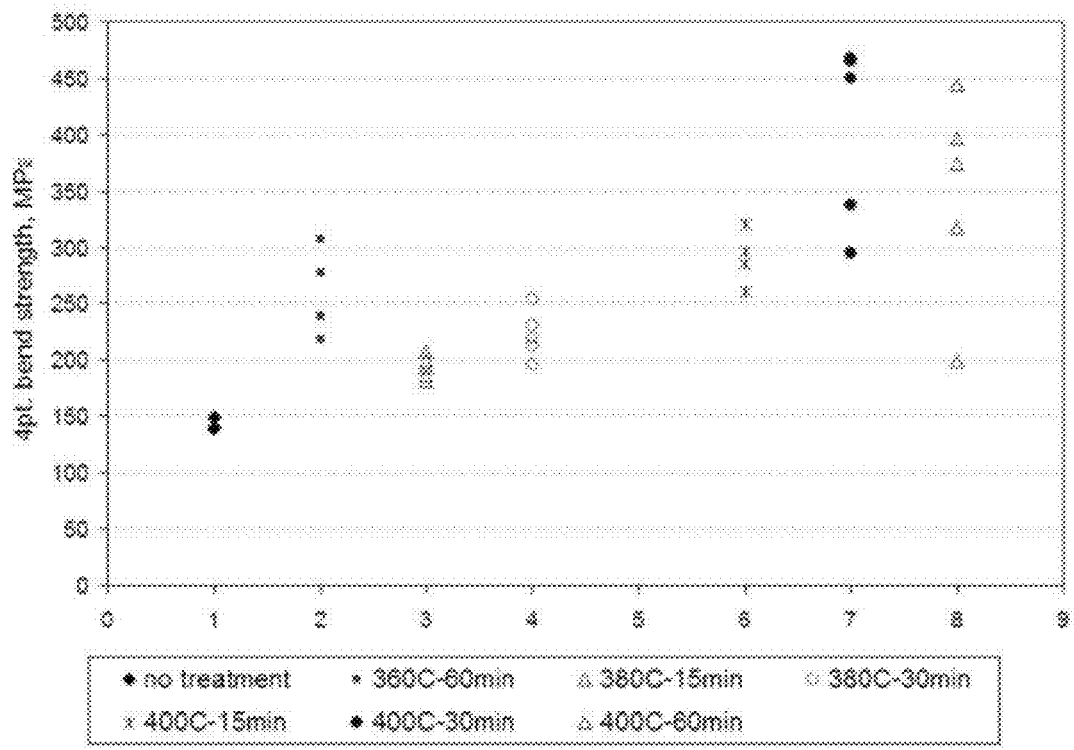
FIG. 6 is a graph illustrating the horizontal bend strength of locally ion-exchanged edges using a potassium containing paste at different treatment time and temperatures.

FIG. 6 shows the improvement in edge strength of parts that were post-ion-exchanged separated and finished, and then treated with a $K^{+1}$-containing paste at different times and temperatures. As shown in the figure, as time and temperature increases, edge strength also increases.

Figure 7:
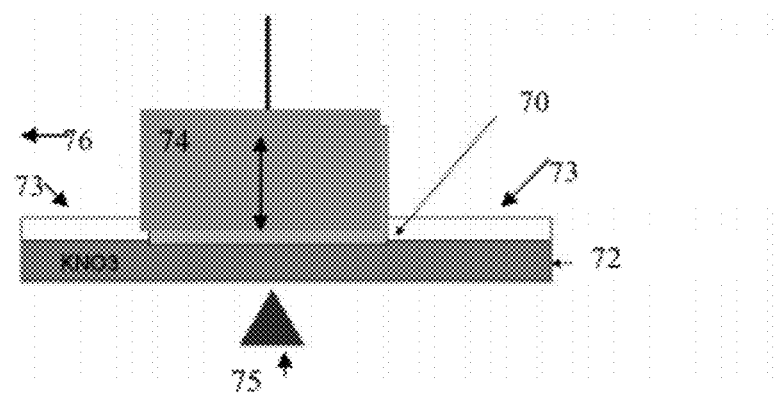
FIG. 7 is a schematic representation of the process for strengthening glass edges using, for example, a molted $KNO_3$ salt 72 in dish 73 bath, wherein 70 represents immersion of the glass edge of glass article 74 in the molten salt bath at a temperature in the range of 390-600° C. for a time in the range of 10-60 minutes while the surfaces of the glass are kept cool using flowing air 76.

Experiments were also performed immersing the post-ion-exchanged, separated and finished edges into a molten salt baths while air was circulating on the glass surface to maintain the temperature<200° C. The target is to reach an edge strength of >400 MPa. FIG. 7 shows a schematic of the process used to carry out these experiments. In FIG. 7 a dish 73 is partially filled with $KNO_3$ 52 which is melted by heater 75 to a temperature in the range of 390° C. to 500° C. An edge 70 of a glass article 74 was immersed into the molted salt for time of ten minutes and the surface of the glass was cooled by flowing are as illustrated by numeral 76. The horizontal bend edge strength results are reported in Table 2. The edge strength increases with temperature, with an average edge strength of 565 MPa for samples treated at 500° C. for 30 min. Fully ion-exchanged edge strength, where the edge has been subjected to the same ion-exchange conditions as the faces of the glass, is in the range of 600-800 MPa.

TABLE 2

| Treatment Conditions | Strength, MPa |
| --- | --- |
| Non-treated | 139 ± 6 |
| 390° C./10 minutes | 183 ± 20 |
| 390° C./25 minutes | 197 ± 36 |
| 500° C./30 minutes | 565 ± 24 |

Localized heating of the edge(s) with microwaves and pastes were also evaluated. Since SiC is a strong microwave susceptor it was added to a KNO3 paste in a selected amount to promote heating in those areas there the paste was applied when it was subjected to microwave radiation. For exemplary purposes the paste was applied to the surface of Gorilla® Glass (Corning Incorporated) and subjected to K-band MW radiation for 30 min at ~390° C. After treatment DOL and CS were 46 μm and 215 MPa; respectively.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

We claim:

1. A method for strengthening one or a plurality of the edges of a glass article cut from a large sheet of ion-exchanged glass, the method comprising the steps of
   providing a glass article having alkali metal ions in said glass, and having one or a plurality of edges defined by a chemically strengthened first and second glass face, and a selected thickness, wherein the one or a plurality of said edges is not chemically strengthened;
   providing a ion-exchange material for applying to said one or plurality of edges to thereby chemically strengthen said one or plurality of edge, said ion-exchange material containing alkali metal ions largo larger than the alkali metal ions in said glass;
   applying said ion-exchange material to said one or plurality of edges,
   heating said ion-exchange material applied to said one or plurality of edges to a selected temperature for a selected time to thereby exchange smaller ions in said glass for larger ions in said ion-exchange material; and
   removing said ion-exchange material from said one or plurality of edges to thereby provide an article having a selected compressive stress to a selected depth along said one or plurality of edges;
   wherein the first and second faces of the glass are cooled to a temperature of less than 200° C. during the ion-exchange of the edge(s).

2. The method according to claim 1, wherein said glass article has touch screen electronics on one of said faces of said glass.

3. The method according to claim 1, wherein said glass is a chemically strengthened glass selected from the group consisting of aluminosilicate, borosilicate, aluminoborosilicate and soda lime glasses.

4. The method according to claim 1, wherein the ion-exchange material is a molten salt bath into which an edge of said glass article is inserted, said salt bath having a selected temperature is in the range of 390° C. to 600° C. and said selected time is in the range of 10 minutes to 60 minutes.

5. The method according to claim 1, wherein the ion-exchange material applied to the one or plurality of edges is a paste containing alkali metal ions larger than the exchangeable alkali metal ions in the glass.

6. The method according to claim 5, wherein the paste is heated by microwave radiation.

7. The method according to claim 1, wherein the ion-exchange material applied to the one or plurality of edges is a glass frit material.

8. The method according to claim 1, wherein said glass article has a thickness in the range of 0.3 mm to 1.5 mm.

9. The method according to claim 1, wherein said ion-exchange of said one or plurality of edges produces a depth-of-layer of 40-50 μm and a compressive stress in the range of 180 to 600 MPa.

* * * * *